US009779087B2

(12) United States Patent
Das et al.

(10) Patent No.: US 9,779,087 B2
(45) Date of Patent: Oct. 3, 2017

(54) CROSS-LINGUAL DISCRIMINATIVE LEARNING OF SEQUENCE MODELS WITH POSTERIOR REGULARIZATION

(71) Applicant: Google Inc., Mountain View, CA (US)

(72) Inventors: Dipanjan Das, Jersey City, NJ (US); Kuzman Ganchev, Forest Hills, NY (US)

(73) Assignee: GOOGLE INC., Mountain View, CA (US)

( * ) Notice: Subject to any disclaimer, the term of this patent is extended or adjusted under 35 U.S.C. 154(b) by 355 days.

(21) Appl. No.: 14/105,973

(22) Filed: Dec. 13, 2013

(65) Prior Publication Data

US 2015/0169549 A1 Jun. 18, 2015

(51) Int. Cl.
*G06F 17/27* (2006.01)
*G06F 17/28* (2006.01)

(52) U.S. Cl.
CPC ............ *G06F 17/289* (2013.01); *G06F 17/27* (2013.01); *G06F 17/2827* (2013.01)

(58) Field of Classification Search
USPC ....................................................... 704/1–10
See application file for complete search history.

(56) References Cited

U.S. PATENT DOCUMENTS

| | | | | |
|---|---|---|---|---|
| 5,477,451 A | * | 12/1995 | Brown ................ | G06F 17/2755 704/2 |
| 5,510,981 A | * | 4/1996 | Berger ................ | G06F 17/2827 704/2 |
| 5,541,836 A | * | 7/1996 | Church ................ | G06F 17/274 704/7 |
| 5,724,593 A | * | 3/1998 | Hargrave, III ...... | G06F 17/2827 704/7 |
| 5,802,539 A | * | 9/1998 | Daniels ................ | G06F 17/21 704/7 |
| 5,850,561 A | * | 12/1998 | Church ................ | G06F 17/2795 715/234 |

(Continued)

OTHER PUBLICATIONS

Ganchev et al. "Posterior Regularization for Structured Latent Variable Models", Journal of Machine Learning Research 11, pp. 2001-2049, published in 2010.*

(Continued)

*Primary Examiner* — Jialong He
(74) *Attorney, Agent, or Firm* — RMCK Law Group, PLC

(57) ABSTRACT

A computer-implemented method can include obtaining (i) an aligned bi-text for a source language and a target language, and (ii) a supervised sequence model for the source language. The method can include labeling a source side of the aligned bi-text using the supervised sequence model and projecting labels from the labeled source side to a target side of the aligned bi-text to obtain a labeled target side of the aligned bi-text. The method can include filtering the labeled target side based on a task of a natural language processing (NLP) system configured to utilize a sequence model for the target language to obtain a filtered target side of the aligned bi-text. The method can also include training the sequence model for the target language using posterior regularization with soft constraints on the filtered target side to obtain a trained sequence model for the target language.

14 Claims, 3 Drawing Sheets

(56) References Cited

U.S. PATENT DOCUMENTS

| | | | | | |
|---|---|---|---|---|---|
| 6,092,034 | A * | 7/2000 | McCarley | G06F 17/2795 704/2 |
| 6,304,841 | B1 * | 10/2001 | Berger | G06F 17/277 704/2 |
| 7,937,265 | B1 * | 5/2011 | Pasca | G06F 17/2775 704/1 |
| 8,275,605 | B2 * | 9/2012 | Menezes | G06F 17/2827 704/2 |
| 8,296,127 | B2 * | 10/2012 | Marcu | G06F 17/2809 704/2 |
| 8,560,477 | B1 * | 10/2013 | Petrov | G06N 99/005 706/46 |
| 8,666,725 | B2 * | 3/2014 | Och | G06F 17/2818 704/2 |
| 9,122,674 | B1 * | 9/2015 | Wong | G06F 17/28 |
| 2001/0029455 | A1 * | 10/2001 | Chin | G06F 17/273 704/277 |
| 2003/0135356 | A1 * | 7/2003 | Ying | G06F 17/271 704/1 |
| 2003/0191625 | A1 * | 10/2003 | Gorin | G06F 17/278 704/1 |
| 2004/0122656 | A1 * | 6/2004 | Abir | G06F 17/2872 704/4 |
| 2004/0254781 | A1 * | 12/2004 | Appleby | G06F 17/2827 704/2 |
| 2005/0102614 | A1 * | 5/2005 | Brockett | G06F 17/2765 715/234 |
| 2005/0216443 | A1 * | 9/2005 | Morton | G06F 17/3002 |
| 2006/0106595 | A1 * | 5/2006 | Brockett | G06F 17/2785 704/9 |
| 2007/0073532 | A1 * | 3/2007 | Brockett | G06F 17/289 704/9 |
| 2007/0203707 | A1 * | 8/2007 | Carus | G06F 17/27 704/270 |
| 2008/0010056 | A1 * | 1/2008 | Zhou | G06F 17/2827 704/8 |
| 2008/0262826 | A1 * | 10/2008 | Pacull | G06F 17/2818 704/3 |
| 2009/0281789 | A1 * | 11/2009 | Waibel | G06F 17/2735 704/3 |
| 2010/0223047 | A1 * | 9/2010 | Christ | G06F 17/2836 704/4 |
| 2013/0103695 | A1 * | 4/2013 | Rarrick | G06F 17/2854 707/748 |
| 2015/0154184 | A1 * | 6/2015 | Bahgat | G06F 17/271 704/2 |
| 2015/0169549 | A1 * | 6/2015 | Das | G06F 17/289 704/2 |

OTHER PUBLICATIONS

Das et al. "Unsupervised Part-of-Speech Tagging with Bilingual Graph-Based Projections", Proceedings of the 49th Annual Meeting of the Association for Computational Linguistics, pp. 600-609, Portland, Oregon, Jun. 19-24, 2011.*

Dyer, C., "A Formal Model of Ambiguity and Its Applications in Machine Translation," Dissertation submitted to the Faculty of the Graduate School of the University of Maryland, College Park, 2010, 159 pages.

Ganchev, K. et al., "Dependency Grammar Induction via Bitext Projection Constraints," Proceedings of the 47th Annual Meeting of the ACL and the 4th IJCNLP of the AFNLP, pp. 369-377, Suntec, Singapore, Aug. 2-7, 2009.

Ganchev, K. et al., "Posterior Regularization for Structured Latent Variable Models," Journal of Machine Learning Research 11 (2010) 2001-2049.

Gillenwater, J. et al., "Sparsity in Dependency Grammar Induction," Proceedings of the ACL 2010 Conference Short Papers, pp. 194-199, Uppsala, Sweden, Jul. 11-16, 2010.

McDonald, R. et al., "Multi-Source Transfer of Delexicalized Dependency Parsers," Proceedings of the 2011 Conference on Empirical Methods in Natural Language Processing, pp. 62-72, Edinburgh, Scotland, UK, Jul. 27-31, 2011.

Tackstrom, O. et al, "Token and Type Constraints for Cross-Lingual Part-of-Speech Tagging," Transactions of the Association for Computational Linguistics, 1 (2013), pp. 1-12.

* cited by examiner

CROSS-LINGUAL DISCRIMINATIVE LEARNING OF SEQUENCE MODELS WITH POSTERIOR REGULARIZATION

FIELD

The present disclosure relates to natural language processing and, more particularly, to cross-lingual discriminative learning of sequence models with posterior regularization.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Sequence models can be used for building natural language systems, such as part-of-speech taggers, named entity segmenters, and mention chunkers (shallow/light parsers). Sequence models can be trained using training data that is labeled or annotated by linguists. Natural language systems, however, may be limited to specific languages for which sufficient labeled training data exists, which are also known as resource-rich languages (e.g., English, French, German, Spanish, Japanese, and Korean). Obtaining labeled training data for other languages, also known as resource-poor languages (e.g., Catalan, Estonian, Norwegian, and Ukrainian), can be costly and/or time consuming. Therefore, efficient techniques for cross-lingual learning of sequence models are needed.

SUMMARY

A computer-implemented method is presented. The method can include obtaining, at a computing device having one or more processors, (i) an aligned bi-text for a source language and a target language, and (ii) a supervised sequence model for the source language. The method can include labeling, at the computing device, a source side of the aligned bi-text using the supervised sequence model to obtain a labeled source side of the aligned bi-text. The method can include projecting, at the computing device, labels from the labeled source side to a target side of the aligned bi-text to obtain a labeled target side of the aligned bi-text. The method can include filtering, at the computing device, the labeled target side based on a task of a natural language processing (NLP) system configured to utilize a sequence model for the target language to obtain a filtered target side of the aligned bi-text. The method can also include training, at the computing device, the sequence model for the target language using posterior regularization with soft constraints on the filtered target side to obtain a trained sequence model for the target language.

In some embodiments, the method further includes filtering, at the computing device, the aligned bi-text to remove sentence pairs based on the task of the NLP system.

In other embodiments, the task of the NLP system is part-of-speech (POS) tagging for the target language.

In some embodiments, the task of the NLP system is named entity segmenting.

In other embodiments, filtering the labeled target side includes utilizing a dictionary for the target language to remove labels projected from the labeled source side.

In some embodiments, filtering the aligned bi-text includes removing at least one of (i) sentence pairs where greater than a threshold of source language tokens are unaligned, (ii) sentence pairs where an entity is unaligned, (iii) sentence pairs having an entity longer than three tokens, and (iv) sentence pairs having no entities.

In other embodiments, training the sequence model using posterior regularization with soft constraints includes optimizing an objective function using stochastic projected gradients for parameters for the sequence model and optimal dual variables, wherein the objective function is defined as:

$$\max_{\theta} \min_{\lambda \geq 0} b \cdot \lambda + \log \sum_{Y} p_\theta(Y \mid X) e^{-\lambda^* \cdot \phi(Y,X)} - \gamma \|\theta\|,$$

where $\theta$ represents the parameters for the sequence model, $\lambda^*$ represents the optimal dual variables, b represents a vector of values that serve as upper bounds to the expectations of every constraint feature $\phi$, $p_\theta(Y|X)$ represents a probability distribution for all sentences in a corpus X and their labelings Y, and $\gamma\|\theta\|$ represents a gamma distribution of the constraint features $\phi$.

In some embodiments, the source language is a resource-rich language having an abundance of labeled training data, and the target language is a resource-poor language having approximately no labeled training data.

In other embodiments, the method further includes: receiving, at the computing device, a question in the target language, analyzing, at the computing device, the question using the trained sequence model to obtain an answer to the question, and outputting, from the computing device, the answer.

A computing device is also presented. The computing device can include one or more processors configured to perform operations including obtaining (i) an aligned bi-text for a source language and a target language, and (ii) a supervised sequence model for the source language. The operations can include labeling a source side of the aligned bi-text using the supervised sequence model to obtain a labeled source side of the aligned bi-text. The operations can include projecting labels from the labeled source side to a target side of the aligned bi-text to obtain a labeled target side of the aligned bi-text. The operations can include filtering the labeled target side based on a task of a natural language processing (NLP) system configured to utilize a sequence model for the target language to obtain a filtered target side of the aligned bi-text. The operations can also include training the sequence model for the target language using posterior regularization with soft constraints on the filtered target side to obtain a trained sequence model for the target language.

In some embodiments, the operations further include filtering the aligned bi-text to remove sentence pairs based on the task of the NLP system.

In other embodiments, the task of the NLP system is part-of-speech (POS) tagging for the target language.

In some embodiments, the task of the NLP system is named entity segmenting.

In other embodiments, filtering the labeled target side includes utilizing a dictionary for the target language to remove labels projected from the labeled source side.

In some embodiments, filtering the aligned bi-text includes removing at least one of (i) sentence pairs where greater than a threshold of source language tokens are unaligned, (ii) sentence pairs where an entity is unaligned, (iii) sentence pairs having an entity longer than three tokens, and (iv) sentence pairs having no entities.

In other embodiments, training the sequence model using posterior regularization with soft constraints includes optimizing an objective function using stochastic projected gradients for parameters for the sequence model and optimal dual variables, wherein the objective function is defined as:

$$\max_{\theta} \min_{\lambda \geq 0} b \cdot \lambda + \log \sum_{Y} p_\theta(Y \mid X) e^{-\lambda^* \cdot \phi(Y,X)} - \gamma \|\theta\|,$$

where θ represents the parameters for the sequence model, λ* represents the optimal dual variables, b represents a vector of values that serve as upper bounds to the expectations of every constraint feature φ, $p_\theta(Y|X)$ represents a probability distribution for all sentences in a corpus X and their labelings Y, and γ||θ| represents a gamma distribution of the constraint features φ.

In some embodiments, the source language is a resource-rich language having an abundance of labeled training data, and the target language is a resource-poor language having approximately no labeled training data.

In other embodiments, the operations further include: receiving a question in the target language, analyzing the question using the trained sequence model to obtain an answer to the question, and outputting the answer.

A non-transitory, computer-readable medium is also presented. The computer-readable medium can have instructions stored thereon that, when executed by one or more processors of a computing device, cause the computing device to perform operations including obtaining (i) an aligned bi-text for a source language and a target language, and (ii) a supervised sequence model for the source language. The operations can include labeling a source side of the aligned bi-text using the supervised sequence model to obtain a labeled source side of the aligned bi-text. The operations can include projecting labels from the labeled source side to a target side of the aligned bi-text to obtain a labeled target side of the aligned bi-text. The operations can include filtering the labeled target side based on a task of a natural language processing (NLP) system configured to utilize a sequence model for the target language to obtain a filtered target side of the aligned bi-text. The operations can also include training the sequence model for the target language using posterior regularization with soft constraints on the filtered target side to obtain a trained sequence model for the target language.

In some embodiments, training the sequence model using posterior regularization with soft constraints includes optimizing an objective function using stochastic projected gradients for parameters for the sequence model and optimal dual variables, wherein the objective function is defined as:

$$\max_{\theta} \min_{\lambda \geq 0} b \cdot \lambda + \log \sum_{Y} p_\theta(Y \mid X) e^{-\lambda^* \cdot \phi(Y,X)} - \gamma \|\theta\|,$$

where θ represents the parameters for the sequence model, λ* represents the optimal dual variables, b represents a vector of values that serve as upper bounds to the expectations of every constraint feature φ, $p_\theta(Y|X)$ represents a probability distribution for all sentences in a corpus X and their labelings Y, and γ||θ| represents a gamma distribution of the constraint features φ.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
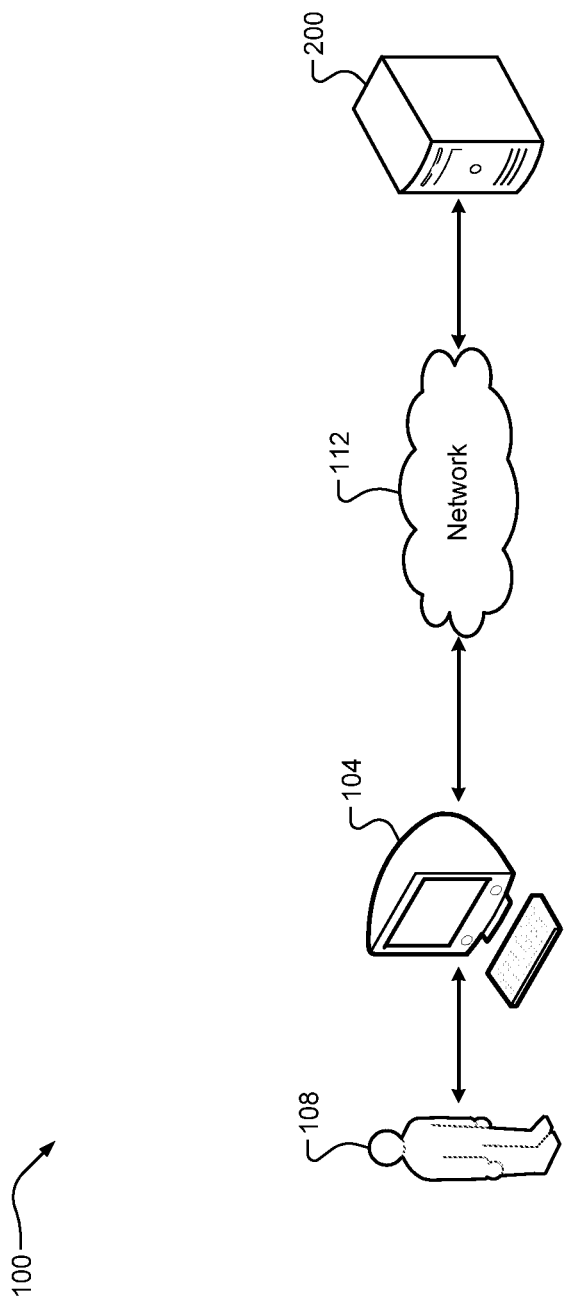
FIG. 1 is a functional block diagram of a computing network including an example computing device according to some implementations of the present disclosure.

Referring now to FIG. 1, a computing network 100 is illustrated. A computing device 104 (a desktop computer, a laptop computer, a tablet computer, a mobile phone, etc.) can receive input from and/or provide output to a user 108. The computing device 104 can communicate with other computing devices via a network 112. The network 112 can include a local area network (LAN), a wide area network (WAN), e.g., the Internet, or a combination thereof. In some embodiments, the other computing device 200 may take the form of a server as illustrated. It should be appreciated that the term "server" as used herein can refer to both a single server and two or more servers operating in a parallel or distributed architecture. The computing device 200 can be configured to perform techniques for cross-lingual discriminative learning of sequence models with posterior regularization. It should be appreciated, however, that the computing device 104 may also at least partially perform these techniques.

According to the techniques of the present disclosure, the computing device 200 can obtain an aligned bi-text in a source language and a target language. The bi-text can include sentences in the source language, corresponding translations of the source language sentences to the target language, and alignments between words in the sentences across the source and target languages. The source language can be a resource-rich language. The term "resource rich" can refer to the corresponding language having a large amount of labeled training data. Examples of resource-rich languages include English, French, German, Spanish, Japanese, and Korean. The term "label" can refer to a tag of a word in a particular language, such as a part-of-speech (POS) tag or an entity type tag (miscellaneous, location, etc.). The target language can be a resource-poor language. The term "resource-poor" can refer to the corresponding language having no labeled training data or approximately no labeled training data. Examples of resource-poor languages include Catalan, Estonian, Norwegian, and Ukrainian. A supervised sequence model for the source language can be obtained by the computing device 200 and utilized to label a source side of the aligned bi-text to obtain a labeled source side. The labels from the source side can then be projected to a target side of the aligned bi-text to obtain a labeled target side.

The labels can be filtered based on a task of an NLP system configured to utilize a sequence model for the target language to obtain a filtered target side. The task for the NLP system can be, for example, part-of-speech (POS) tagging or named entity segmenting. Other suitable tasks can be implemented, however, such as mention chunking. In one implementation, the sequence model for the target language can be a discriminative conditional random field (CRF) model for the target language. The sequence model for the target language can be trained using posterior regularization with soft constraints on the filtered target side to obtain a trained sequence model. For example, the soft constraints may be derived from cross-lingual alignment information. The unsupervised NLP system can then utilize the trained sequence model for more accurate NLP. For example, the unsupervised NLP system can be utilized to provide more accurate answers to user questions via more accurate processing of the questions.

Figure 2:
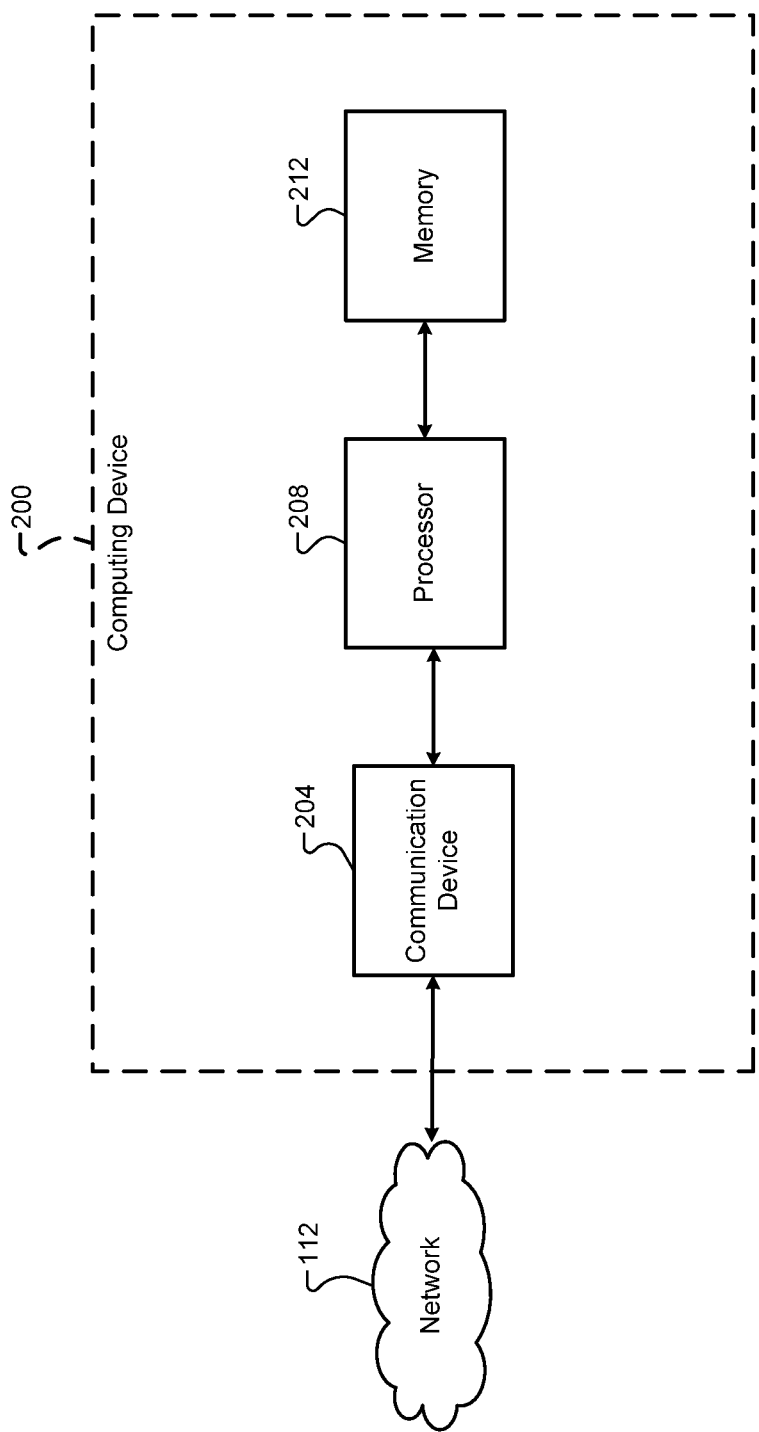
FIG. 2 is a functional block diagram of the example computing device of FIG. 1.

Referring now to FIG. 2, a functional block diagram of the example computing device 200 of FIG. 1 is illustrated. The computing device 200 can include a communication device 204, a processor 208, and a memory 212. The communication device 204 can control communication between the computing device 200 and other devices via the network 112. The communication device 204 can include any suitable components for communication via the network 112, e.g., a transceiver. In particular, the communication device 204 can control communication between the computing device 200 and the computing device 104 via the network 112. The communication device 200 can receive an aligned bi-text for a source language and a target language. The communication device 200 can also receive a question from a user 108 via the computing device 104 and output an answer to the question to the user 108 at the computing device 104.

The processor 208 can control operation of the computing device 200. It should be appreciated that the term "processor" as used herein can refer to either a single processor or two or more processors operating in a parallel or distributed architecture. For example, the processor 208 can perform functions including, but not limited to loading and executing an operating system of the computing device 200, controlling information input to and/or output from the computing device 200, controlling communication over the network 112 via the communication device 204, and/or controlling read/write operations at the memory 212. The memory 212 can be any suitable storage medium (flash, hard disk, etc.) configured to store information at the computing device 200. The processor 208 can also execute the techniques according to the present disclosure, which are described in greater detail below.

In various embodiments of the present disclosure, the computing device 200 is configured to obtain word aligned (parallel) bi-text. This aligned bi-text can include text in a source language and text in a target language corresponding to a translation of the source language text. The source language can be a resource-rich language, such as English, and the target language can be a resource-poor language. The aligned bi-text can be received at the computing device 200 from another source, e.g., via the network 112, or retrieved from the memory 212. Alternatively, the computing device 200 can perform the alignment itself. The computing device 200 can also obtain a sequence model for the source language. This sequence model can be part of a supervised NLP system. The computing device 200 can also receive task-specific constraints of the target language. These constraints can be based on a task of an unsupervised NLP system configured to utilize a sequence model for the target language. For example, the task can be POS tagging or named entity segmenting.

The computing device 200 can then perform an algorithm to train the sequence model for the target language to obtain a trained sequence model. This algorithm may include ensuring that a set of target language parameters $\theta^f$ are learned. In one implementation, the algorithm can be defined as follows:

(1) Obtain the aligned bi-text $D^{e \leftrightarrow f}$ for the source and target languages $(D^e, D^f)$
(2) Supervised labeling of the source side to obtain a labeled source side $\widehat{D^e}$
(3) Project labels to target side and filter labels to obtain a labeled target side $\widehat{D^f}$
(4) Posterior regularization of $D^f$ with soft constraints C to learn $\theta^f$; and
(5) Return $\theta^f$.

The algorithm above can be generally divided into four sub-tasks. In the first sub-task (1), word alignment can be run over a large corpus of parallel data between the resource-rich source language and the resource-poor target language to obtain the aligned bi-text. In the second sub-task (2), a supervised sequence model for the source language can be utilized to label the source side of the aligned bi-text to obtain the labeled source side. These labels can then be projected to the target side of the aligned bi-text to obtain a labeled target side. In the third sub-task (3), NLP task-specific word-alignment filtering can be performed. In one implementation, this step involves heuristics, such as specific heuristics for the named entity segmenting task. In the fourth sub-task (4), a sequence model for the target language can be trained using posterior regularization with soft constraints to obtain the trained sequence model for the target language. Training this sequence model can include learning the target language parameters.

In one implementation, the sequence model for the target language is a discriminative CRF model. The parameters of this sequence model can be optimized using posterior regularization. The sequence model can model a probability distribution over possible labels for a sentence as follows:

$$p_\theta(y|x) \propto \exp(\theta \cdot f(x,y)) \quad (1),$$

where $p_\theta(y|x)$ represents the probability distribution for the sentence x having a set of all possible labelings Y(x), where y represents particular labelings for the sentence $x (y \in Y(x))$, and where $\theta$ represents parameters for the sequence model and $f(.)$ represents a feature function.

The sequence model can examine sentences in isolation, and the probability of a particular labeling for a corpus can be defined as a product over the individual sentences as follows:

$$p_\theta(Y|X) = \prod_{(x,y)\in(X,Y)} p_\theta(y|x), \quad (2)$$

where X represents a corpus of sentences $\{x_1 \ldots x_n\}$ and Y represents labelings for the corpus $\{y_1 \ldots y_n\}$. Due to the lack of a fully-labeled corpus in the target language, the sequence model can't be trained by optimizing the regularized log-likelihood of the training data.

Constraints on the distribution of labels, however, can be used. Examples of constraints include (i) a particular token may be labeled only by a label inventory licensed by a dictionary, and (ii) a labeling projected from the source language is usually (but not always) correct. The constraints can be defined in terms of feature expectations. A set of distributions can be defined as follows:

$$Q = \{q(Y) : E_q | \phi(Y,X) | \leq b\} \quad (3),$$

where Q is the set of distributions, q(Y) is a distribution over all possible labelings of the corpus Y(X), φ is a constraint feature function, and b is a vector of values that serve as upper bounds to the expectations of every constraint feature.

A posterior regularization objective with no labeled training data can be defined with respect to the set of distributions as follows:

$$PR : \max_\theta J_Q(\theta) = \max_\theta KL(Q \| p_\theta(Y | X)) - \gamma \|\theta\|, \quad (4)$$

where $KL(Q\|p) = \min_{q \in Q} KL(q\|p)$ represents a Kullback-Leibler (KL) divergence from a set to a point, $J_Q$ represents the posterior regularization objective, and $\gamma\|\theta\|$ represents a gamma distribution of the constraint features φ. As more constraints are added, Q can become a smaller set. Therefore, the posterior regularization can degenerate into a convex log-likelihood objective that is typically used for supervised data $J_Q(\theta) = L(\theta)$. The posterior regularization objective, however, does not have to be convex.

An expectation-maximization (EM) algorithm or another algorithm, such as a stochastic update-based algorithm, can be used to optimize the posterior regularization objective $J_Q$. In some implementations, the constraint features φ(Y,X) can be scaled to lie in [0,1] by computing $\max_Y \phi(Y,X)$ for the corpus to which φ is applied in order to make it easier to reason about the constraint values b. The stochastic update-based algorithm can involve computing a minimization $\min_{q \in Q} KL(q\|p)$ at each step, using its dual form. This minimization is convex, so there is no duality gap. Optimal prime variables can then be represented as follows:

$$q^*(Y) = \frac{p_\theta(Y | X) e^{-\lambda^* \cdot \phi(Y,X)}}{Z(\lambda^*)}, \quad (5)$$

where q*(Y) represents the optimal prime variables, λ* represents optimal dual variables, and Z(λ*) represents a normalizer.

The dual problem can be defined as $$\max_{\lambda \geq 0} -b \cdot \lambda - \log Z(\lambda).$$

By substituting the dual problem into the posterior regularization objective defined by Equation 4, a saddle-point problem can be obtained as follows:

$$\max_\theta \min_{\lambda \geq 0} b \cdot \lambda + \log \sum_Y p_\theta(Y | X) e^{-\lambda^* \cdot \phi(Y,X)} - \gamma \|\theta\|. \quad (6)$$

In order to optimize this objective function, partial derivatives can be calculated with respect to both θ and λ.

To calculate the partial derivative of the objective function with respect to θ, expectations of the model features f given the current distribution $p_\theta$ and the constraint distribution q. In order to perform tractable inference, it can be assumed that the feature function factorizes according to smaller parts as follows:

$$f(x, y) = \sum_i f(x, y_i, y_{i-1}), \quad (7)$$

where i represents an index ranging over all tokens in a particular sentence. This factorization can provide for efficient calculation of the expectations over labels $y_i$ and label pairs $(y_i, y_{i+1})$.

To calculate the partial derivative of the objective function with respect to λ, the expectations of the constraint features φ can be determined. Again, in order to perform tractable inference, it can be ensured that the constraint features φ are also factorizing according to the same structure as the model features f. The objective function can then be optimized using a stochastic projected gradient (both partial derivatives). For each training sentence, the gradient for θ and λ can be calculated. A gradient step, e.g., step size 1, can be taken in each calculation, and negative entries in λ can be truncated to zero.

As previously mentioned, the sequence model for the target language can be trained specifically for and then utilized by NLP systems such as POS taggers and named entity segmenters. While these two specific NLP systems are discussed in greater detail below, it should be appreciated that the sequence model for the target language can be trained according to a task of another suitable NLP system such as a mention chunker.

For POS tagging, a search space can be pruned with a dictionary, and soft constraints can be derived by projecting POS tags across word alignments. The alignments can be filtered for confidence and/or to remove projected POS tags that are not licensed by the dictionary. For example, for an English sentence "of Asian sponges" and a Spanish sentence "de las esponjas de Asia," an adjective POS tag for the English word "Asian" can be projected to the Spanish word "Asia" but then filtered out because the Spanish dictionary only associates the noun POS tag with the Spanish word "Asia." In one implementation, a confidence for filtering the word alignments can be 0.95. Features conjoined with just a single POS tag can be referred to as emission features and features with consecutive POS tag pairs can be referred to as transition features. Examples of emission features include a bias feature, the current word, its suffixes of lengths 1-3, its capitalization shape, whether it contains a hyphen, digit, or punctuation, and its cluster. Examples of transition features include a bias feature and the cluster of each of the two words of the transition. For cluster-based features, a monolingual word clusters can be induced with an exchange algorithm.

For named entity segmentation, the task can be identifying boundaries of named-entities for a given language without classifying them by type. This can also be referred to as unlabeled named entity segmentation, which is more amendable to cross-lingual supervision. For example, for the English sentence "of Asian sponges" and the Spanish sentence "de las esponjas de Asia," the English word "Asian" can be labeled as a miscellaneous type, but the Spanish word "Asia" can be labeled as a location type. Projecting entity names across languages can be error-prone due to word alignment errors. Therefore, filtering of the word alignment can be performed aggressively for the named entity segmentation task. In one implementation, sentence pairs can be discarded when at least one of (i) more than a threshold of the source language tokens are unaligned, e.g., 30%, (ii) any source entities are unaligned, and (iii) any source entities are more than four tokens long. Sentence pairs can also be discarded for entities having a confidence less than a threshold. Lastly, sentence pairs can be discarded that have no entities.

Figure 3:
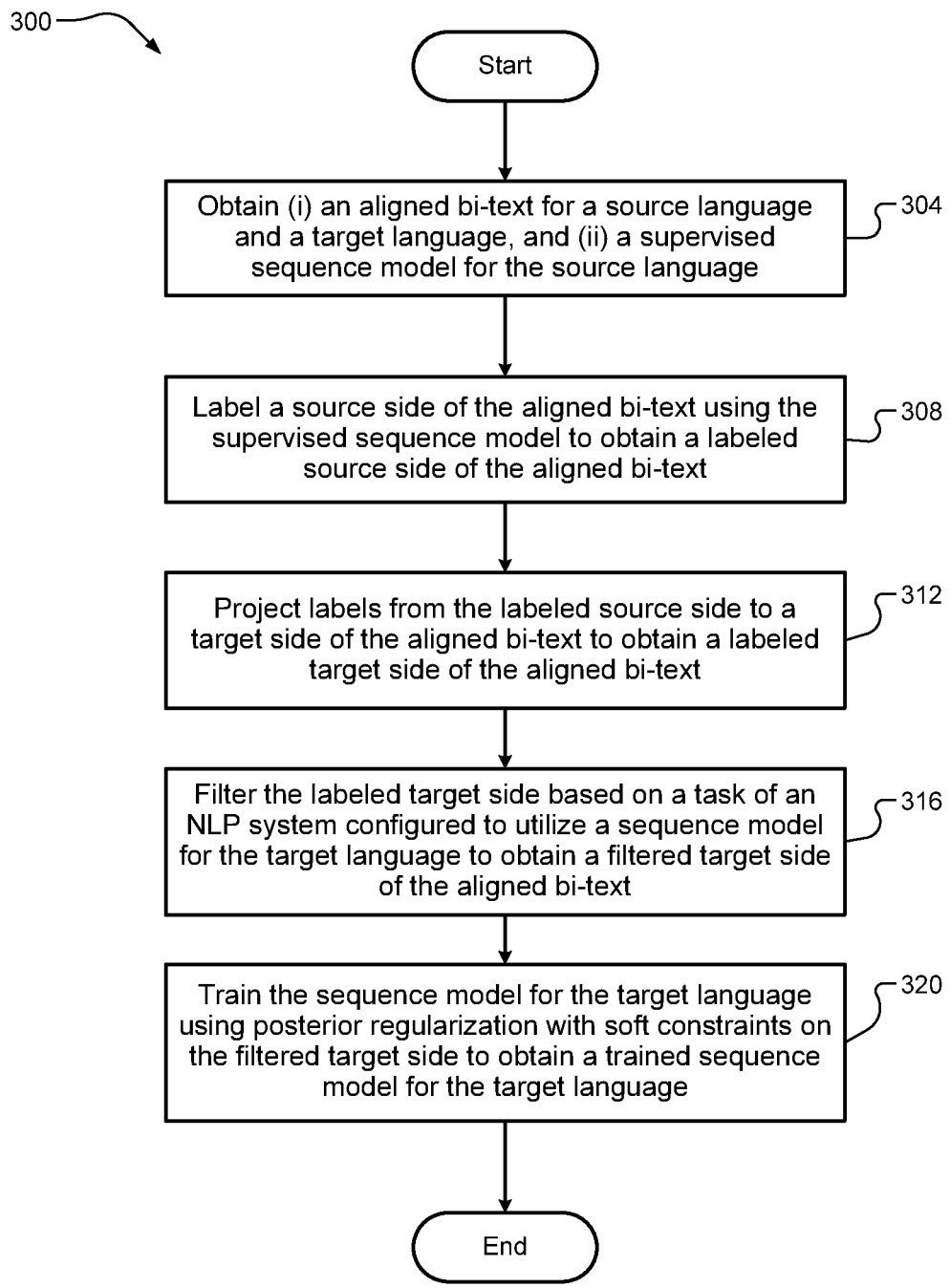
FIG. 3 is a flow diagram of an example technique for cross-lingual discriminative learning of sequence models with posterior regularization according to some implementations of the present disclosure.

Referring now to FIG. 3, a flow diagram of an example technique 300 for cross-lingual discriminative learning of sequence models with posterior regularization is illustrated. At 304, the computing device 200 can obtain (i) an aligned bi-text for a source language and a target language, and (ii) a supervised sequence model for the source language. At 308, the computing device 200 can label a source side of the aligned bi-text using the supervised sequence model to obtain a labeled source side of the aligned bi-text. At 312, the computing device 200 can project labels from the labeled source side to a target side of the aligned bi-text to obtain a labeled target side of the aligned bi-text. At 316, the computing device 200 can filter the labeled target side based on a task of an NLP system configured to utilize a sequence model for the target language to obtain a filtered target side of the aligned bi-text. At 320, the computing device 200 can train the sequence model for the target language using posterior regularization with soft constraints on the filtered target side to obtain a trained sequence model for the target language. The technique 300 can then end or return to 304 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
    obtaining, at a computing device having one or more processors, (i) an aligned bi-text for a source language and a target language, the aligned bi-text comprising a plurality of source-target sentence pairs, and (ii) a supervised sequence model for the source language;
    labeling, at the computing device, each word of a source side of the aligned bi-text using the supervised sequence model to obtain a labeled source side of the aligned bi-text;
    projecting, at the computing device, labels from the labeled source side to a target side of the aligned bi-text to obtain a labeled target side of the aligned bi-text, wherein each label of the labeled source and target sides of the aligned bi-text is a named entity type tag for a particular word;
    filtering, at the computing device, the labeled target side of the aligned bi-text for the target language to obtain a filtered target side of the aligned bi-text for training a sequence model for the target language for a named entity segmentation system, wherein the filtering comprises discarding any particular source-target sentence pair when (i) a threshold amount of tokens of the particular source-target sentence pair are unaligned or (ii) a source named entity of the particular source-target sentence pair is not aligned with a target sentence token;
    training, at the computing device, the sequence model for the target language using posterior regularization with soft constraints on the filtered target side to learn a set of parameters for the target language;
    obtaining, at the computing device, a trained sequence model for the target language using the set of parameters for the target language, the trained sequence model being configured to model a probability distribution over possible labels for text in the target language;
    receiving, at the computing device, an input text in the target language;
    analyzing, at the computing device, the input text using the trained sequence model for the target language; and
    generating, at the computing device, an output based on the analyzing of the input text using the trained sequence model.

2. The computer-implemented method of claim 1, wherein training the sequence model using posterior regularization with soft constraints includes optimizing an objective function using stochastic projected gradients for parameters for the sequence model and optimal dual variables, wherein the objective function is defined as:

$$\max_{\theta} \min_{\lambda \geq 0} b \cdot \lambda + \log \sum_Y p_\theta(Y \mid X) e^{-\lambda^* \cdot \phi(Y,X)} - \gamma \|\theta\|,$$

where $\theta$ represents the parameters for the sequence model, $\lambda^*$ represents the optimal dual variables, b represents a vector of values that serve as upper bounds to the expectations of every constraint feature $\phi$, $p_\theta(Y|X)$ represents a probability distribution for all sentences in a corpus X and their labelings Y, and $\gamma \|\theta\|$ represents a gamma distribution of the constraint features $\phi$.

3. The computer-implemented method of claim 2, wherein optimizing the objective function further comprises calculating partial derivatives with respect to both $\theta$ and $\lambda$.

4. The computer-implemented method of claim 3, wherein calculating the partial derivative with respect to $\theta$ includes:
    determining expectations of the model features f given the current distribution $p_\theta$ and the constraint distribution q; and
    performing tractable inference by assuming that a function $f(x,y)$ of the model features f factorizes according to smaller parts as follows:

$$f(x, y) = \sum_i f(x, y_i, y_{i-1}),$$

where i represents an index ranging over all tokens in a particular sentence x and labels y.

5. The computer-implemented method of claim 4, wherein calculating the partial derivative with respect to $\lambda$ includes:

determining expectations of the constraint features ϕ; and
performing tractable inference by ensuring that ϕ also factorizes according to the same structure as the model features f.

6. The computer-implemented method of claim 5, wherein optimizing the objective function further comprises using stochastic projected gradients for both partial derivatives and, for each training sentence, the gradient for θ and λ is calculated.

7. The computer-implemented method of claim 1, wherein the source language is a resource-rich language having greater than an amount of labeled training data required to train the supervised sequence model for the source language, and wherein the target language is a resource-poor language less than an amount of labeled training data required to train the sequence model for the target language.

8. The computer-implemented method of claim 1, wherein:
the input text is a question; and
the generated output is an answer to the question.

9. A computing device comprising:
a non-transitory computer-readable medium having a set of instructions stored thereon; and
one or more processors configured execute the set of instructions, which causes the computing device to perform operations comprising:
obtaining (i) an aligned bi-text for a source language and a target language, the aligned bi-text comprising a plurality of source-target sentence pairs, and (ii) a supervised sequence model for the source language;
labeling each word of a source side of the aligned bi-text using the supervised sequence model to obtain a labeled source side of the aligned bi-text;
projecting labels from the labeled source side to a target side of the aligned bi-text to obtain a labeled target side of the aligned bi-text, wherein each label of the labeled source and target sides of the aligned bi-text is named entity type tag for a particular word;
filtering the labeled target side to obtain a filtered target side of the aligned bi-text for training a sequence model for the target language for a named entity segmentation system, wherein the filtering comprises discarding any particular source-target sentence pair when (i) the particular source-target sentence pair comprises a named entity having a confidence level less than a confidence threshold or (ii) the particular source-target sentence pair comprises no named entities;
training the sequence model for the target language using posterior regularization with soft constraints on the filtered target side to learn a set of parameters for the target language;
using the set of parameters for the target language, obtaining a trained sequence model for the target language, the trained sequence model being configured to model a probability distribution over possible labels for text in the target language;
receiving an input text in the target language;
analyzing the input text using the trained sequence model for the target language; and
generating an output based on the analyzing of the input text using the trained sequence model.

10. The computing device of claim 9, wherein training the sequence model using posterior regularization with soft constraints includes optimizing an objective function using stochastic projected gradients for parameters for the sequence model and optimal dual variables, wherein the objective function is defined as:

$$\max_{\theta} \min_{\lambda \geq 0} b \cdot \lambda + \log \sum_Y p_\theta(Y \mid X) e^{-\lambda^* \cdot \phi(Y,X)} - \gamma \|\theta\|,$$

where θ represents the parameters for the sequence model, λ* represents the optimal dual variables, b represents a vector of values that serve as upper bounds to the expectations of every constraint feature ϕ, $p_\theta(Y|X)$ represents a probability distribution for all sentences in a corpus X and their labelings Y, and γ‖θ‖ represents a gamma distribution of the constraint features ϕ.

11. The computing device of claim 9, wherein the source language is a resource-rich language having greater than an amount of labeled training data required to train the supervised sequence model for the source language, and wherein the target language is a resource-poor language having less than an amount of labeled training data required to train the sequence model for the target language.

12. The computing device of claim 9, wherein:
the input text is a question; and
the generated output is an answer to the question.

13. A non-transitory, computer-readable medium having instructions stored thereon that, when executed by one or more processors of a computing device, cause the computing device to perform operations comprising:
obtaining (i) an aligned bi-text for a source language and a target language, the aligned bi-text comprising a plurality of source-target sentence pairs, and (ii) a supervised sequence model for the source language, the source language being a resource-rich language having greater than an amount of labeled training data required to train the supervised sequence model, the target language being a resource-poor language having less than an amount of labeled training data required to train the sequence model for the target language;
labeling a source side of the aligned bi-text using the supervised sequence model to obtain a labeled source side of the aligned bi-text;
projecting labels from the labeled source side to a target side of the aligned bi-text to obtain a labeled target side of the aligned bi-text, wherein every label in the labeled source and target sides of the aligned bi-text is a named entity type tag for a particular word;
filtering the labeled target side to obtain a filtered target side of the aligned bi-text for training a sequence model for the target language for a named entity segmentation system, wherein the filtering comprises discarding any particular source-target sentence pair when (i) a threshold amount of tokens of the particular source-target sentence pair are unaligned or (ii) a source named entity of the particular source-target sentence pair is not aligned with a target sentence token;
training the sequence model for the target language using posterior regularization with soft constraints on the filtered target side to learn a set of parameters for the target language;
obtaining a trained sequence model for the target language using the set of parameters for the target language, the trained sequence model being configured to model a probability distribution over possible labels for text in the target language;
receiving an input text in the target language;

analyzing the input text using the trained sequence model for the target language; and generating an output based on the analyzing of the input text using the trained sequence model.

14. The computer-readable medium of claim 13, wherein training the sequence model using posterior regularization with soft constraints includes optimizing an objective function using stochastic projected gradients for parameters for the sequence model and optimal dual variables, wherein the objective function is defined as:

$$\max_{\theta} \min_{\lambda \geq 0} b \cdot \lambda + \log \sum_{Y} p_\theta(Y \mid X) e^{-\lambda^* \cdot \phi(Y,X)} - \gamma \|\theta\|,$$

where $\theta$ represents the parameters for the sequence model, $\lambda^*$ represents the optimal dual variables, b represents a vector of values that serve as upper bounds to the expectations of every constraint feature $\phi$, $p_\theta(Y|X)$ represents a probability distribution for all sentences in a corpus X and their labelings Y, and $\gamma\|\theta\|$ represents a gamma distribution of the constraint features $\phi$.

* * * * *